United States Patent [19]

Chiba et al.

[11] 4,189,508
[45] Feb. 19, 1980

[54] PROCESS FOR THE PREPARATION OF MAGNETIC RECORDING MEDIUM

[75] Inventors: Katsuyoshi Chiba, Hachioji; Yoshiki Kato, Hinodemachi; Teruo Tsunoda, Nanpeidaimachi; Hajime Fukke, Inagi; Teruaki Kobayashi, Hachioji; Heigo Ishihara, Kokubunji; Waichi Nagashiro, Hachioji; Munehisa Mitsuya, Tokyo, all of Japan

[73] Assignee: Hitachi, Ltd., Japan

[21] Appl. No.: 943,123

[22] Filed: Sep. 18, 1978

[30] Foreign Application Priority Data

Sep. 22, 1977 [JP] Japan .................... 52/113348

[51] Int. Cl.² ............................................. H01F 10/02
[52] U.S. Cl. ....................................... 427/48; 427/128
[58] Field of Search ............................... 427/48, 128

[56] References Cited
FOREIGN PATENT DOCUMENTS 2444971  4/1976  Fed. Rep. of Germany ............. 427/48

Primary Examiner—Bernard D. Pianalto
Attorney, Agent, or Firm—Craig and Antonelli

[57] ABSTRACT

A process for the preparation of a magnetic recording medium comprising;
applying a magnetic coating material composed of dispersing a ferromagnetic fine powder in a high molecular binder onto the surfaces of a nonmagnetic support member to form a coating thereon;
arraying one or more sets of magnet pairs on the sides of front and back surfaces of said support member, each of said magnet pairs being deviated by a predetermined distance in the moving direction of said support member such that said magnet pairs will not face to each other; and
applying a magnetic field in such a manner that the magnetic field applied to said coating by the magnet pairs arrayed on the side of the front surface of said support member is greater than the magnetic field applied to said coating by the magnet pairs arrayed on the side of the back surface of said support member, thereby satisfying the requirements of $$Do \leqq a, b$$

wherein Do represents a distance between the surface of said support member and said magnet pairs, a an average distance between the magnets constituting said magnet pairs arrayed on the side of the front surface of said support member, and b an average distance between the magnets constituting said magnet pairs arrayed on the side of the back surface of said support member.

9 Claims, 15 Drawing Figures

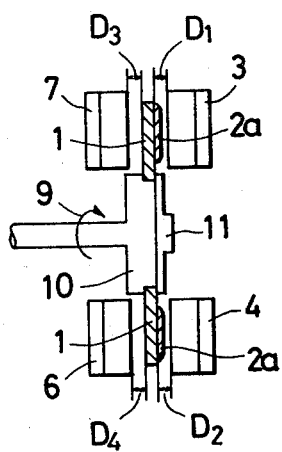
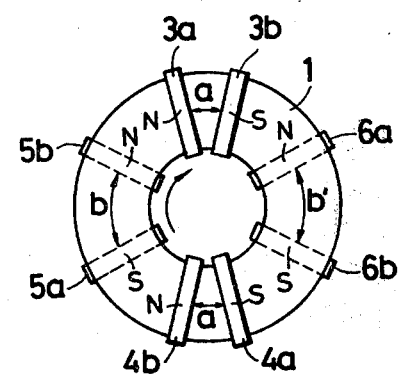
FIG. 1-A    FIG. 1-B
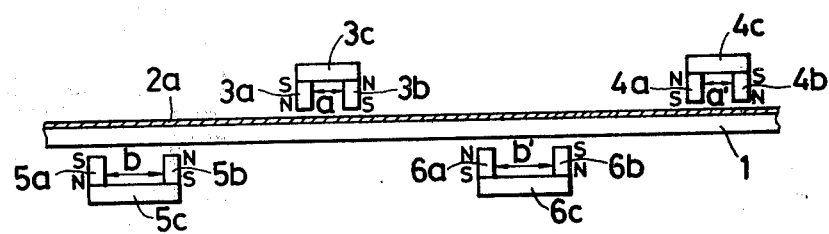
FIG. 1-C

FIG. 2-A
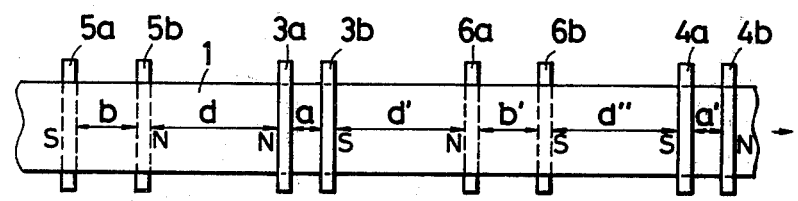
FIG. 2-B
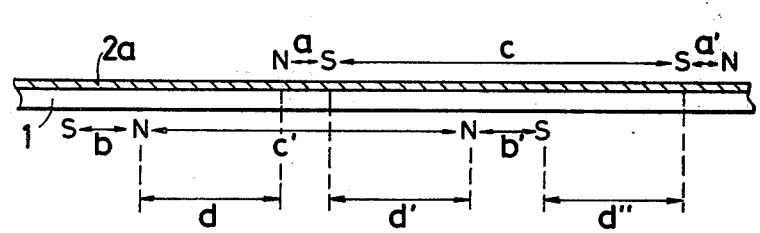

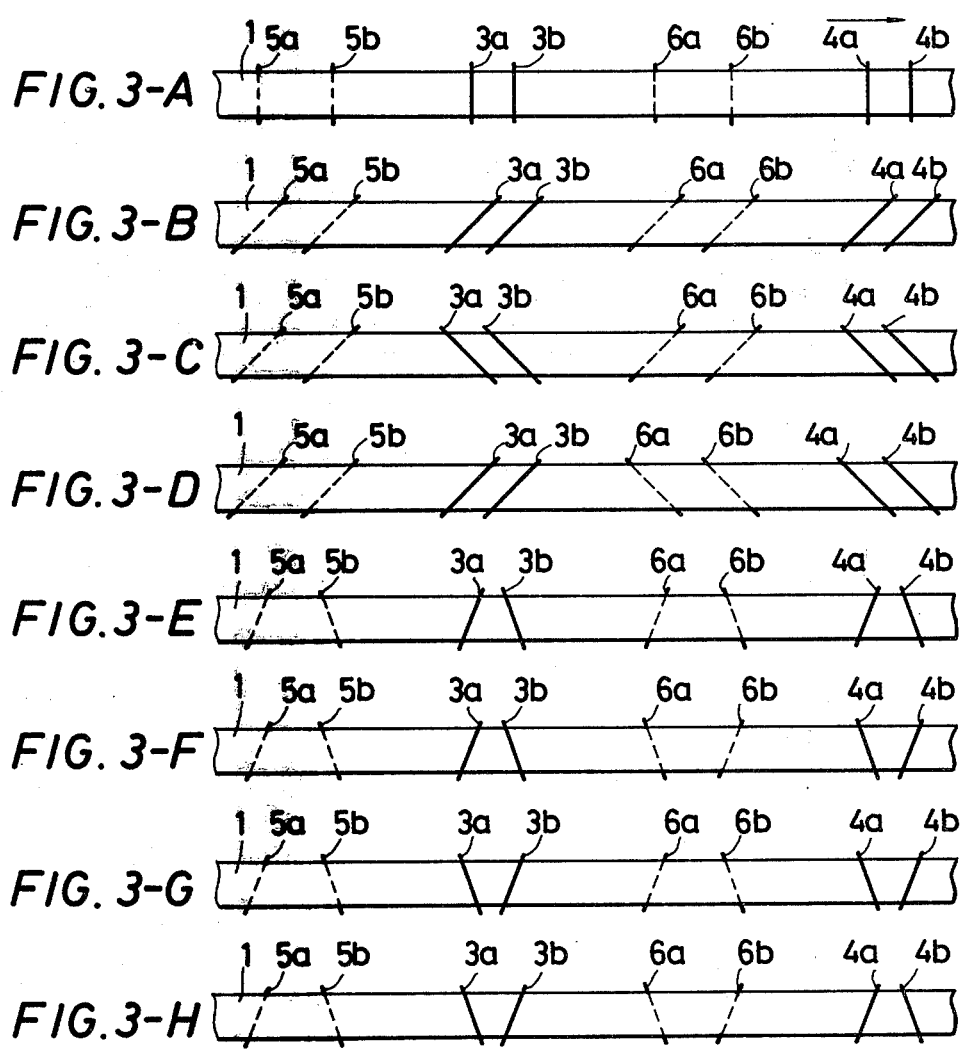

PROCESS FOR THE PREPARATION OF MAGNETIC RECORDING MEDIUM

BACKGROUND OF THE INVENTION

The present invention relates to a process for the preparation of high-performance magnetic recording medium obtained by coating a magnetic coating material on the magnetic discs that are used as file memories of electronic computers or the like, or on various other nonmagnetic support members, and particularly it relates to a process for the preparation of magnetic recording medium having a magnetic coating layer of a thickness of about 1 μm.

The trend toward higher recording densities of modern magnetic recording media has required a substantial decrease in the thickness of the recording media of the type of magnetic coating layers, presenting problems of reduced output of electric signals and insufficient resolution at high frequencies. Therefore, increasing demand has been placed in developing the technique of applying more sophisticated magnetic orientation in order to obtain magnetic recording media maintaining high output and excellent resolution.

In order to increase the reproducing outputs of recording, in general, the residual magnetic flux of the magnetic coating layer should be increased. One of the methods for this purpose may be to increase the thickness of the coating layer. The increased thickness of the coating layer, however, deteriorates the characteristics at high frequencies. To improve the high-frequency characteristics, on the other hand, it is necessary to reduce the thickness of the coating layer as well as to increase the coercive force. If the thickness of the coating layer having high coercive force is greatly reduced, the high-frequency characteristics will be improved but sacrificing the characteristics at low frequencies. If the thickness of the coating layer having high coercive force is increased, on the other hand, the magnetic field acts upon the surface areas only at high frequencies, making it difficult to erase the records.

Therefore, ideal recording medium having both of these characteristics consists of providing a thin magnetic coating layer composed of a material having high coercive force on a magnetic coating layer of a relatively large thickness having relatively small coercive force as well as great residual magnetic flux. From this viewpoint, there was proposed a double-coating method which coats such two different layers. Such methods have been disclosed, for example, in Japanese Published Examined Patent Application No. 52-28364. Such methods, however, required complex manufacturing steps resulting in increased manufacturing cost. The double-coating method could be applicable to the magnetic tapes having a coating thickness of about 10 μm, but was not applicable to the coating layers having a thickness of about 1 μm such as magnetic discs for high-density recording. Japanese Published Examined Patent Application No. 39-19281 discloses a method of producing such a magnetic recording medium through one time of coating operation and magnetic orientation. According to this method, a mixture of a magnetic iron oxide powder having a relatively large particle size and the shape of a needle and a magnetic alloy powder having a small particle size and a spherical shape, is coated onto a support member, whereby the dispersion density of the alloy powder having small particle size is increased on the surface areas, in order that a thin layer of alloy powder is coated just on the layer of iron oxide powder. An existing powder of magnetic iron oxide is useable as a magnetic powder having such a large particle size. In many cases, such powders are of the shape of a needle having a length of about 1 μm, a coercive force Hc of 250 to 280 oersteds and a residual magnetization Br of about 500 to 600 gausses. The powder having a small particle size may be a magnetic alloy composed of nickel, cobalt, iron and the like. In many cases, such powder will have a spherical shape of a diameter of smaller than 0.2 μm, a coercive force of greater than 500 oersteds and a residual magnetization of larger than 1500 gausses. A mixture of these two powders (the mixing ratio may be 10 for the former and 1–4 for the latter, though it may vary depending upon the purposes) is coated to a thickness of about 6–13 μm. In this state, the two powders are nearly homogeneously blended together. Under this state, the mixture is subjected to a d-c magnetic field from a magnet placed below the support member before the coated layer is solidified. In this case, the needle-shaped powder having large particle size receives greater attractive force than that of the powder having small particle size, and is collected toward the support member thereby to form a layer on the relatively lower side, while the density of the powder having small particle size is increased toward the upper layer. Thus a coating layer is formed on the support member, consisting of a mixture of the magnetic powder having a relatively large particle size and a small coercive force and the magnetic powder having a relatively small particle size and a large coercive force, wherein the latter powder on the recording surface remote from the support member exhibits greater dispersion density than that of the former powder.

According to the abovementioned method, however, the magnetic field is allowed to be applied only one time. If the magnetic field is applied two or more times repetitively, the oriented powder is disturbed by the second or subsequent application of magnetic field, whereby the surface of the coating layer is coarsened producing the noise level and deteriorating the signal-to-noise ratio. Further, if the magnetic field is repetitively applied by the abovementioned method, the magnetic powder having a relatively small particle size and a high coercive force is finally collected toward the support member, degrading the separation of the two magnetic powders. In the case of a magnetic disc, therefore, even when the magnetic field is oriented using a single set of magnets, the rotation of the magnetic disc renders itself subjected to the magnetic field several times. Because of these reasons, the method disclosed in Japanese Published Examined Patent Application No. 39-19281 is applicable to only the magnetic tapes having a coating layer thickness of about 6 to 13 μm.

Further, in forming a magnetic coating layer of a thickness of about 1 μm on the surface of an aluminum disc or the like by means of the centrifugal coating method, it has also been conventionally performed to adjust the magnetic field orientation for the magnetic powders in the coating layer or to increase the content of magnetic powder to complement the decrease of output due to the reduced thickness of the coating. The object of the magnetic field orientation so far employed, however, was simply to orient the magnetic powder in the direction of reproducing the recording. Moreover, a limitation is imposed on the concentration of magnetic powders in the coating layer, because the increased concentration deteriorates the resolution and decreases the mechanical strength of the coating layer. In general, the content of the magnetic powders is about 50% for the magnetic discs and about 70% for the magnetic tapes.

List of Prior Art (37 CFR 1.56(a))

The following references are cited to show the state of the art:

Japanese Published Examined Patent Application 52-28364 (1977), and

Japanese Published Examined Patent Application 39-19281 (1964).

SUMMARY OF THE INVENTION

The object of the present invention is to provide an improved process for the preparation of a magnetic recording medium.

Another object of the present invention is to provide a process for the preparation of a magnetic recording medium having very small ruggidness on the whole surface of the coating layer, excellent surface smoothness, excellent electrical properties and excellent magnetic properties.

A further object of the present invention is to provide a process for the preparation of a magnetic recording medium having no fluctuation in the thickness of the coating layer over the whole recording surface, excellent surface smoothness, excellent electrical properties and excellent magnetic properties, by way of the magnetic orientation.

These and other objects of the present invention can be achieved by a process for the preparation of a magnetic recording medium comprising applying a magnetic coating material composed of dispersing a ferromagnetic fine powder in a high molecular binder onto the surfaces of a nonmagnetic support member to form a coating layer thereon, and applying a magnetic field which is at least greater than the coercive force of said ferromagnetic fine powder over a predetermined length of said coating layer while said support member is moved in a predetermined direction of said coating layer before said coating layer is dried, using magnetic pairs, each consisting of two magnets having N pole and S pole at their ends to face to said support member thereby to magnetically orient said ferromagnetic fine powders in said coating layer, wherein one or more sets of magnet pairs are arrayed on the sides of front and back surfaces of said support member in a deviated manner by a predetermined distance in the moving direction of said support member such that said magnet pairs will not face to each other, and said magnetic field is applied in such a manner that the magnetic field applied to said coating layer by the magnet pairs arrayed on the side of the front surface of said support member is greater than the magnetic field applied to said coating layer by the magnet pairs arrayed on the side of the back surface of said support member, thereby satisfying the requirements $$Do \leqq a, b$$

wherein Do represents a distance between the surface of said support member and said magnet pairs, $a$ an average distance between the magnets constituting said magnet pairs arrayed on the side of the front surface of said support member, and $b$ an average distance between the magnets constituting said magnet pairs arrayed on the side of the back surface of said support member.

BRIEF DESCRIPTION OF THE DRAWINGS

FIG. 1-A, FIG. 1-B, FIG. 1-C, FIG. 2-A, FIG. 2-B, FIG. 3-A, FIG. 3-B, FIG. 3-C, FIG. 3-D, FIG. 3-E, FIG. 3-F, FIG. 3-G and FIG. 3-H are schematic diagrams for illustrating the concept of the method of magnetic orientation according to the present invention;

DETAILED DESCRIPTION OF THE PREFERRED EMBODIMENTS

Figure 4:
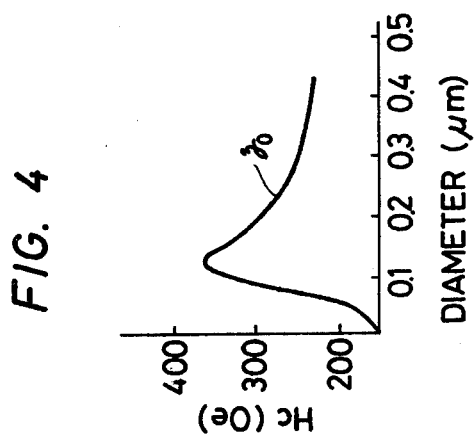
FIG. 4 is a diagram for showing the relation between the particle size of a ferromagnetic fine powder and the coercive force.

The present invention is contrived based on the fact that a magnetic powder having even a relatively small apparent coercive force contains particles of high coercive force corresponding to the distribution of particle sizes, and that such particles tend to form agglomerates of fine particles having relatively great coercive force. That is, according to the present invention, the conditions of magnetic orientation are specified while collecting the magnetic particles of high coercive force on the surface areas of the magnetic coating layer by forming agglomerates of several to several tens of magnetic fine particles, increasing the density of each of the agglomerates, and causing the coercive force Hc on the surface layer to be greater than that of the inner layer by effectively utilizing the form anisotropic properties of the particles. As an example, the relation between the particle size of the ferromagnetic particles and the coercive force is represented by a curve $y_o$ in FIG. 4 (where the diameter is found by converting the volume of the magnetic particles into equivalent spheres).

The procedure according to the present invention is carried out roughly as mentioned below. For example, four pairs of bar magnets each consisting of two bar magnets are radially arrayed adjacent to each other, two pairs of which being located above the upper surface of an aluminum disc and another two pairs of which being located below the lower surface of the aluminum disc. Onto the aluminum disc is then coated a magnetic coating material composed of dispersing a ferromagnetic fine powder in a high molecular binder solution by means of a rotary spraying method. When a magnetic disc having a recording density of 10,000 BPI is to be obtained, for example, the magnetic coating layer is so formed by the rotary spraying method that the thickness is about $1.0\pm0.2$ μm in the inner circumferential areas of the disc and is about $1.5\pm0.2$ μm in the outer circumferential areas. Before the coating layer is dried, the disc is slowly turned to magnetically orient the magnetic particles in the coating layer by applying a stronger magnetic field to the surface areas of the coating layer than the magnetic field applied to the inner layer utilizing the abovesaid magnet pairs. The coating layer is then heated and hardened, and is so ground that the thickness will be about $0.5\pm0.2$ μm in the inner circumferential areas and about $0.8\pm0.2$ μm in the outer circumferential areas.

It is thus allowed to obtain a magnetic disc free of cracks, having superior surface smoothness to the conventional counterparts, and excellent electrical characteristics. It is also possible to obtain magnetic tapes having excellent characteristics by the similar methods.

The setup and effects of the present invention is illustrated below in detail with reference to the accompanying drawings and concrete embodiments.

FIG. 1-A, FIG. 1-B and FIG. 1-C are to show the concept of a mechanism for giving magnetic orientation and its operation when the present invention is applied to the production of a magnetic disc. In the drawings, reference numeral 1 represents a disc substrate made of a nonmagnetic material (such as aluminum, glass, etc.), 10 a plate for supporting the nonmagnetic disc, 11 a jig for supporting the nonmagnetic disc, 9 an arrow for indicating the rotating direction of the disc 1, and reference numeral 2a denotes a non-dried magnetic coating layer formed on the disc substrate 1 by spraying a magnetic coating material obtained by dispersing a ferromagnetic fine powder in a high molecular binder by means of the rotary spraying method.

Reference numerals 3, 4, 5 and 6 represent magnet pairs formed in a U-shape using a pair of plate magnets (designated at a, b) and a yoke (designated at c), wherein the magnet pairs 3 and 4 are arrayed on the side of the front surface of the substrate 1, and the magnet pairs 5 and 6 are arrayed on the side of the back surface of the substrate 1 at deviated positions as shown.

In the drawings, symbols a, a', b and b' denote distances between the plate magnets constituting each of the pairs, and symbols $D_1$, $D_2$, $D_3$ and $D_4$ ($=D_o$) represent the distances between the surfaces of poles of the magnet pairs 3, 4, 5, 6 and either the front or back surface of the substrate 1. The feature of the present invention is that the abovesaid distances $D_o$, a, a', b and b' establish the following relation, $D_o \leq a$, $a' \leq b$, $b'$ (a sign of equality is put to take the thickness of the substrate 1 into consideration). Below is mentioned the arrangement of poles of the magnet pairs 3, 4, 5 and 6 disposed on both sides of the disc substrate. As shown in FIG. 1-B and FIG. 1-C, it is effective if N-S poles and S-N poles are placed on the side of the front surface, and N-S poles and S-N poles are placed on the side of the back surface. As can be appreciated by considering FIG. 1-C, the magnetic field produced by these magnet pairs is an attractive magnetic field.

Although in the foregoing was mentioned the case in which two magnet pairs are placed each on the front side and on the back side of the disc substrate, only one pair or two or more pairs may of course be provided. When two or more magnet pairs are used in either side of the substrate, the abovesaid distances a, a',—and b, b',—may be changed provided the abovementioned requirement is satisfied.

It is, however, necessary to place the magnet pairs in a deviated manner. Further, the cross-sectional shape of the two unit magnets constituting the magnet pair needs not be limited to a rectangular shape only, but may be formed in a circular or oval shape with the end surfaces being curved to form the shape of a bar. Moreover, the magnets may be electromagnets instead of permanent magnets.

FIG. 2-A and FIG. 2-B are a schematic plan view and a schematic cross-sectional view when the present invention is applied to a magnetic tape. The numerals and symbols designate the same meanings as those of FIG. 1-A to FIG. 1-C. The pole arrangements of the magnet pairs on the side of the front surface of a tape-like support member 1 (on the side having a non-dried magnetic coating 2a) and on the side of the back surface thereof, are N-S poles, S-N poles and S-N poles, N-S poles just like that of the development of FIG. 1-C.

In either case of these drawings, the support member 1 having non-dried magnetic coating layer 2a passes through the magnet pairs 3, 4 and magnet pairs 5, 6 that are placed on the sides of both the front and back surfaces of the support member 1. In this case, since the magnet pairs 3, 4 on the side of the front surface of the support member 1 is closer to the surface of the coating layer 2a than the magnet pairs 5, 6 located on the side of the back surface of the support member 1, and further since the distances a, a' between the unit magnets of the magnet pairs 3, 4 are smaller than the distances b, b' of the magnet pairs 5, 6, the surface areas of the coating is subjected to the application of stronger magnetic field than that applied to the inner layer, whereby the surface layer possesses higher coercive force than the inner layer, and the magnetic orientation is effectively applied to the coating layer. In FIGS. 2-A and 2-B, symbols c, c' represent distances between the magnet pairs, disposed on the front and back sides of the support member 1, and symbols d, d' and d" represent distances among the magnet pairs on both the front and back sides of the support member.

FIGS. 3-A to 3-H show practical examples of arraying other magnet pairs applying the present invention. In these examples, the angles of unit magnets disposed on the front and back sides of the tape are varied with respect to the direction in which the tape runs depending upon the purposes of electromagnetic characteristics that are to be imparted to the magnetic tape. In the drawings, solid lines show the array of magnets on the front side of the support member, and dotted lines show the array of magnets on the back side of the support member. FIG. 3-A shows the arrangement suited for producing magnetic tapes for audio applications, and FIGS. 3-B to 3-H show the arrangements suited for producing magnetic tapes for digital applications.

As mentioned above, the present invention is applicable to the production of magnetic tapes as well as magnetic discs. In manufacturing the magnetic discs, however, the present invention is desirably applied when the coating layer of a thickness of 3 to 0.3 $\mu$m is to be formed. Further, the distances a, a' should preferably be 3 to 30 mm, the distances b, b' should be 9 to 90 mm, and the distance Do should preferably range from 0.5 to 10 mm.

The effects of the present invention are illustrated below with reference to a working Example.

EXAMPLE

A coating material was prepared by means of a ball mill using 300 g of a needle-like Y-$Fe_2O_3$ (average size of 0.4×0.005 $\mu$m, coercive force of 330 oersteds), 300 g of a mixture binder chiefly composed of an epoxide resin and a phenol-formaldehyde resin, and 850 g of a mixture solvent composed of cyclohexanone and toluene. The thus obtained coating material was blended with isophorone to adjust the viscosity to 100 cp and was centrifugally coated on an aluminum substrate (having an inner diameter of 170 mm, an outer diameter of 356 mm, and a thickness of 2 mm) at a rotating speed of 1000 rpm for 20 seconds, thereby to form a coating layer having a thickness of about 1.0 $\mu$m when it was dried. The thus obtained coated substrate was mounted on a magnetic orientation apparatus that was illustrated with reference to FIGS. 1-A to 1-C above, to subject it to the treatment of magnetic orientation. During the treatment of magnetic orientation, the substrate was rotated at 4 rpm, the distances a, a' of magnet pairs on the front side of the substrate was set at 10 mm, the distances b, b' of magnet pairs on the back side of the substrate was set at 30 mm, and the distance Do between the surfaces of the substrate and each of the magnet pairs was set at 2 to 3 mm.

Figure 5:
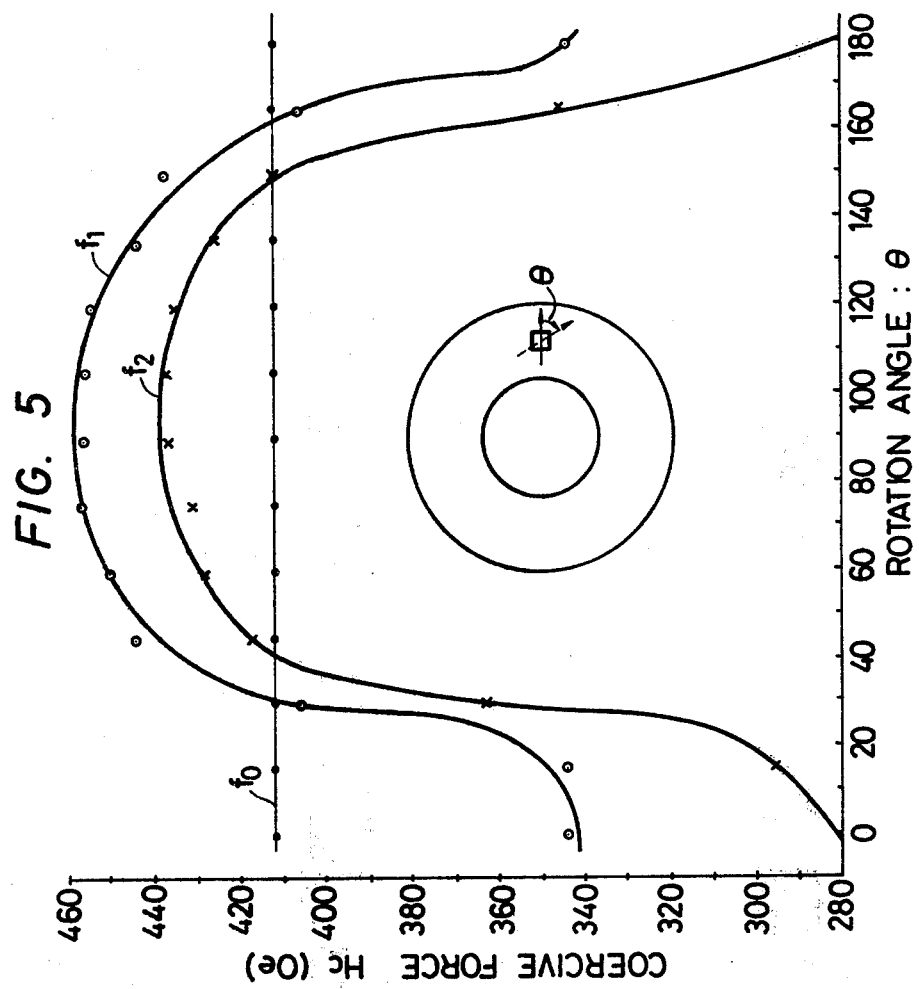
FIG. 5 is a diagram for illustrating various embodiments in which the present invention is applied for the preparation of magnetic tapes.

A central portion of the magnetic disc having the magnetic coating layer thus magnetically oriented by the abovementioned process of the present invention was cut into a square of a side of 1 cm, and was rotated clockwise in the magnetic field with the radial direction of the disc as a reference to measure the coercive force Hc. A curve $f_1$ of FIG. 5 shows a relation between the coercive force Hc and the angle $\theta$. In FIG. 5, a straight line $f_0$ represents the coercive force Hc of a non-oriented specimen (having a coating thickness of 1.0 $\mu$m), and a curve $f_2$ represents the coercive force Hc of the specimen (having a coating thickness of 1.0 $\mu$m) represented by the curve $f_1$ of which surface was further polished to a coating thickness of 0.5 $\mu$m. In FIG. 5, further, marks · and X were spotted based on the measured values. It will be obvious that the surface areas of the magnetic recording layer (magnetic coating layer) exhibits greater coercive force than the inner portions.

Comparison of the non-oriented specimen with the oriented specimen prepared according to the process of the present invention by way of a penetrating electron microphotography of the magnetic coating layer polished to a thickness of 0.1 $\mu$m, indicates that the oriented specimen obtained by the process of the present invention contains agglomerates of fine magnetic particles of a size of about 1.0 $\mu$m that are oriented in the circumferential direction of the disc. That is, according to the process of the present invention, such agglomerates are densely collected near the surface of the magnetic coating layer, whereby the form anisotropic property effectively works such that greater coercive force is exhibited by the surface of the coating layer than the coercive force by the inner portions of the coating layer. The intensity of magnetic field is 1000±100 oersteds, and the magnetic field is applied for 3 minutes.

Referring to the methods of applying the present invention to the magnetic tapes as shown in FIGS. 2-A, 2-B, 3-A to 3-H, the magnetic tapes for general applications (audio applications) can be obtained by the method of FIG. 3-A. In producing magnetic tapes for computer applications (digital applications) utilizing saturated residual magnetic flux, however, it is necessary to reduce the phase shift (peak shift) of the data bits read out from the magnetic recording medium. The experiment therefore was carried out by arraying the magnets at various angles as illustrated by the methods of FIG. 3-B to FIG. 3-H. The experimental results revealed that the peak shift can be minimized by any methods, and the coercive force can be increased at the surface areas of the magnetic coating layer. The conditions of orientation were the same as those mentioned earlier.

Usually, the oriented magnetic discs and magnetic tapes used for electronic computers and tape recorders should have a value Br/Bm 70±5% or more as compared to 55% of the non-oriented discs or tapes. The intensity of the magnetic field should be at least greater than the coercive force Hc of the magnetic powder, and preferably more than two times of the coercive force.

The thus obtained magnetic recording medium exhibited excellent electromagnetic characteristics, and presented no problem for use as magnetic discs or magnetic tapes.

What is claimed is:

1. A process for the preparation of magnetic recording medium comprising applying a magnetic coating material composed of a ferromagnetic fine powder dispersed in a high molecular binder onto the surface of a front side of a nonmagnetic support member to form a coating layer thereon, and applying a magnetic field of at least greater than the coercive force of said ferromagnetic fine powder over a predetermined length of said coating layer while said support member is moved in a predetermined direction of said coating layer before said coating layer is dried, using magnet pairs, each consisting of two magnets having N pole and S pole at their ends to face to said support member, thereby to magnetically orient said ferromagnetic fine powders in said coating layer, wherein a plurality of sets of magnet pairs are arrayed on both the front and back sides of said support member in a deviated manner by a predetermined distance in the moving direction of said support member such that said magnet pairs will not face to each other, the poles of the magnet pairs arrayed on both the front and back sides of said support member are so arrayed that the neighboring poles of adjacent magnet pairs, on the same side of the support member, are of the same polarity, and a magnetic field is applied by the magnet pairs in such a manner that the magnetic field applied to said coating by the magnet pairs arrayed on the front side of said support member is greater than the magnetic field applied to said coating by the magnet pairs arrayed on the back side of said support member, thereby satisfying the requirement, $$Do \leq a, b$$

wherein Do represents a distance between the surface of said support member and said magnet pairs, a an average distance between the magnets constituting said magnet pairs arrayed on the front side of said support member, and b an average distance between the magnets constituting said magnet pairs arrayed on the back side of said support member.

2. A process for the preparation of magnetic recording medium according to claim 1, wherein the requirement that the magnetic field applied to said coating layer by the magnet pairs arrayed on the front side of said support member is greater than the magnetic field applied to said coating layer by the magnet pairs arrayed on the back side of said support member, satisfies the requirement of said distances a and b of $a \leq b$.

3. A process for the preparation of magnetic recording medium according to claim 1, wherein the magnetic field applied by the magnet pairs is an attractive magnetic field.

4. A process for the preparation of magnetic recording medium according to claim 1, wherein said support member is a disc or a tape.

5. A process for the preparation of magnetic recording medium according to claim 1, wherein the distance Do between the magnet pairs ranges from 0.5 mm to 10 mm.

6. A process for the preparation of magnetic recording medium according to claim 1, wherein the distance a ranges from 3 to 30 mm, and the distance b ranges from 9 to 90 mm.

7. A process for the preparation of magnetic recording medium according to claim 1, wherein said support member is a disc, and the thickness of the coating layer ranges from 3 to 0.3 μm.

8. A process for the preparation of magnetic recording medium according to claim 7, wherein two sets of magnet pairs are disposed each on the front side of said disc and on the back side of said disc.

9. A process for the preparation of magnetic recording medium according to claim 1, wherein said support member is a tape and each magnet is arrayed at an oblique angle to the predetermined direction of movement of the support member.

* * * * *